(12) United States Patent
Lee et al.

(10) Patent No.: US 7,133,895 B1
(45) Date of Patent: Nov. 7, 2006

(54) SYSTEM AND METHOD OF INTEGRATING COLLABORATION SYSTEMS WITH BROWSER BASED APPLICATION SYSTEMS

(75) Inventors: Wan Lee, Sunnyvale, CA (US); Zhanye Tong, Foster City, CA (US)

(73) Assignee: Siebel Systems, Inc., San Mateo, CA (US)

( * ) Notice: Subject to any disclaimer, the term of this patent is extended or adjusted under 35 U.S.C. 154(b) by 753 days.

(21) Appl. No.: 09/967,366

(22) Filed: Sep. 28, 2001

Related U.S. Application Data

(60) Provisional application No. 60/270,138, filed on Feb. 20, 2001.

(51) Int. Cl.
G06F 15/16 (2006.01)

(52) U.S. Cl. .................... 709/204; 715/512

(58) Field of Classification Search ............. 709/204, 709/205, 227; 707/10, 201; 715/501.1, 715/512
See application file for complete search history.

(56) References Cited

U.S. PATENT DOCUMENTS

| | | | |
|---|---|---|---|
| 6,212,534 B1 * | 4/2001 | Lo et al. ............... | 715/511 |
| 6,230,171 B1 * | 5/2001 | Pacifici et al. ............... | 715/512 |
| 6,298,356 B1 * | 10/2001 | Jawahar et al. ............. | 707/201 |
| 6,351,777 B1 * | 2/2002 | Simonoff ..................... | 709/250 |
| 6,353,851 B1 * | 3/2002 | Anupam et al. ............ | 709/204 |
| 6,360,250 B1 * | 3/2002 | Anupam et al. ............ | 709/204 |
| 6,598,074 B1 * | 7/2003 | Moller et al. ................ | 709/204 |
| 6,725,453 B1 * | 4/2004 | Lucas et al. ................. | 717/178 |
| 2002/0029250 A1 * | 3/2002 | Reiner ........................ | 709/206 |

* cited by examiner

*Primary Examiner*—Jungwon Chang
(74) *Attorney, Agent, or Firm*—Blakely, Sokoloff, Taylor & Zafman

(57) ABSTRACT

A system and method to integrate various collaboration systems with a browser based application systems. The system and method includes the application system and the collaboration system communicating with each other to transmit notifications and requests from a terminal coupled to both systems. The communication interface between the browser based application system and the collaboration system is based on a protocol such as HTTP protocol. The APIs for the inbound communications to the application system are transparent to the collaboration system and the APIs for the outbound communications are transparent to the application system. Parameter passing is done using configurable placeholders in URL and script templates.

38 Claims, 10 Drawing Sheets

```
[EventResponse:SubmitButtonClick]
Response_0 = "OnSubmitCreateActivity"
Response_1 = "OnSubmitSendToWCServer"
Response_2 = "OnSubmitSendToUQServer"
Response_4 = "OnSubmitBuildView"
ExecuteAll = "True"

[EventResponse:OnSubmitCreateActivity]
(Omitted)

[EventResponse:OnSubmitSendToWCServer]
Method                         = "Web Collab Service.SendHttp"
Param.HTTPRequestURLTemplate   = "(CallerSubmitURL)"
Param.HTTPRequestMethod        = "POST"

[EventResponse:OnSubmitSendToUQServer]
(Omitted)

[EventResponse:OnSubmitBuildView]
Method                         = "Web Collab Service.BuildView"
Param.PiggybackScriptTemplate  = "(CallerUIScript)"
Param.ViewName                 = "Web Collaboration Ack View"
```

FIGURE 10

```
$ServerHost$\Servlet\Submit?sessionId=$SessionID$&
                        userId=$UserID$&
                        initialPage=$LoginURL$&
                        logout=$LogoutURL$&
                        cancel=$CancelRequestURL$
```

FIGURE 11

```
<SCRIPT LANGUAGE="JavaScript">
var type    = "$ContactMethods$";
var feature = "height=200, width=300, menubar=no";
var name    = "SWC" + "$SessionID$";
var win     = window.open("",name,feature);

win.document.write ("<html>\n<form name='CUIForm' action='$ServerHost$/$LangCode$/");

if (type=="VOIP_COLLAB")
    win.document.write("AudioStart.jsp' method='GET'>\n");
else
    win.document.write("ThankYou.jps' method='GET'>\n");

win.document.write("<input type=hidden name='SID'          value='$SessionID$'>\n");
win.document.write("<input type=hidden name='UID'          value='$UserID$'>\n");
win.document.write("<input type=hidden name='USR'          value='$UserName$'>\n");
win.document.write("<input type=hidden name='CANCEL_URL'   value='$CancelRequestURL$'>\n");

if (type=="CHAT_ONLY")
    win.document.write("<input type=hidden name='CHATONLY' value='true'>\n");
else
    win.document.write("<input type=hidden name='AUDIO' value='true'>\n");

win.document.write("</form><script>document.CUIForm.submit();</script></html>");
</SCRIPT>
```

FIGURE 12

SYSTEM AND METHOD OF INTEGRATING COLLABORATION SYSTEMS WITH BROWSER BASED APPLICATION SYSTEMS

CROSS REFERENCE TO RELATED APPLICATIONS

This application claims the benefit of U.S. Provisional Application No. 60/270,138 filed Feb. 20, 2001.

TECHNICAL FIELD

This disclosure relates generally to networked browser based computer systems and particularly but not exclusively relates to an integrated collaboration system and networked browser based application computer system.

BACKGROUND

Networked browser based application computer systems are preferred to be capable of providing an apparatus and a method for user service agents to collaborate across the network with user clients. A collaboration system provides a powerful tool for user service agents to better serve network coupled user clients to engage in verbal and visual communications at the same time remotely.

There are many independently developed collaboration systems that employ different collaboration technologies and provide different features such as web chatting, desktop presentation, voice over the network using network protocols, collaborative browsing, and real-time form filling, etc. Presently, integrated collaboration systems and networked browser based application computer systems are not platform independent and collaboration system independent.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

One skilled in the relevant art will recognize, however, that the invention can be practiced without one or more of the specific details, or with other steps, methods, systems, components, etc. In other instances, well-known structures, materials, system components, or steps of methods are not shown or described in detail to avoid obscuring aspects of the invention. The order of description should not be construed as to imply that these operations are necessarily order dependent.

FIG. 10 portrays an embodiment of a configuration to implement the method portrayed with reference to FIG. 9.

FIG. 11 portrays an embodiment of a Uniform Resource Locator (URL) template that uses placeholders to obtain runtime values.

FIG. 12 portrays an embodiment of a script template that uses placeholders to obtain runtime values.

DETAILED DESCRIPTION OF THE ILLUSTRATED EMBODIMENTS

Embodiments of an open framework for integrating collaboration systems into application systems are described herein. In the following description, numerous specific details are provided, to provide a thorough understanding of embodiments of the invention. One skilled in the relevant art will recognize, however, that the invention can be practiced without one or more of the specific details, or with other steps, methods, systems, components, materials, etc. In other instances, well-known structures, materials, system components, or steps of methods are not shown or described in detail to avoid obscuring aspects of the invention.

Reference throughout this specification to "one embodiment" or "an embodiment" means that a particular feature, structure, step, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, steps, or characteristics may be combined in any suitable manner in one or more embodiments. The embodiment of a application system applications and activities, and collaboration system applications and activities, and method of integrating and operating the application system applications and activities, and the collaboration system applications and activities, including input mechanisms, selection display and selection procedure usage and design, URLs, scripts, and interface templates, are purely illustrative of one of many embodiments of the present invention.

An embodiment of the present invention includes a machine readable medium to store a computing program and data. A machine readable medium includes any mechanism that provides (i.e. stores and/or transmits) information in a form readable by a machine such as a computer. For example, a machine readable medium includes, and is not limited to, read only memory (ROM); random access memory (RAM); magnetic disk storage media; optical storage media; flash memory devices; electrical, optical, acoustical or other form of propagated signals (such as carrier waves, infrared signals, digital signals, and so forth), or any type of media suitable for storing electronic instructions or data.

Various operations will be described as multiple discrete steps performed in turn in a manner that is most helpful in understanding the present invention. However, the order of description should not be construed as to imply that these operations are necessarily order dependent, in particular, the order the steps are presented. Any necessary ordering is alternatively expressly mentioned or will be understood by those skilled in the art.

Figure 1:
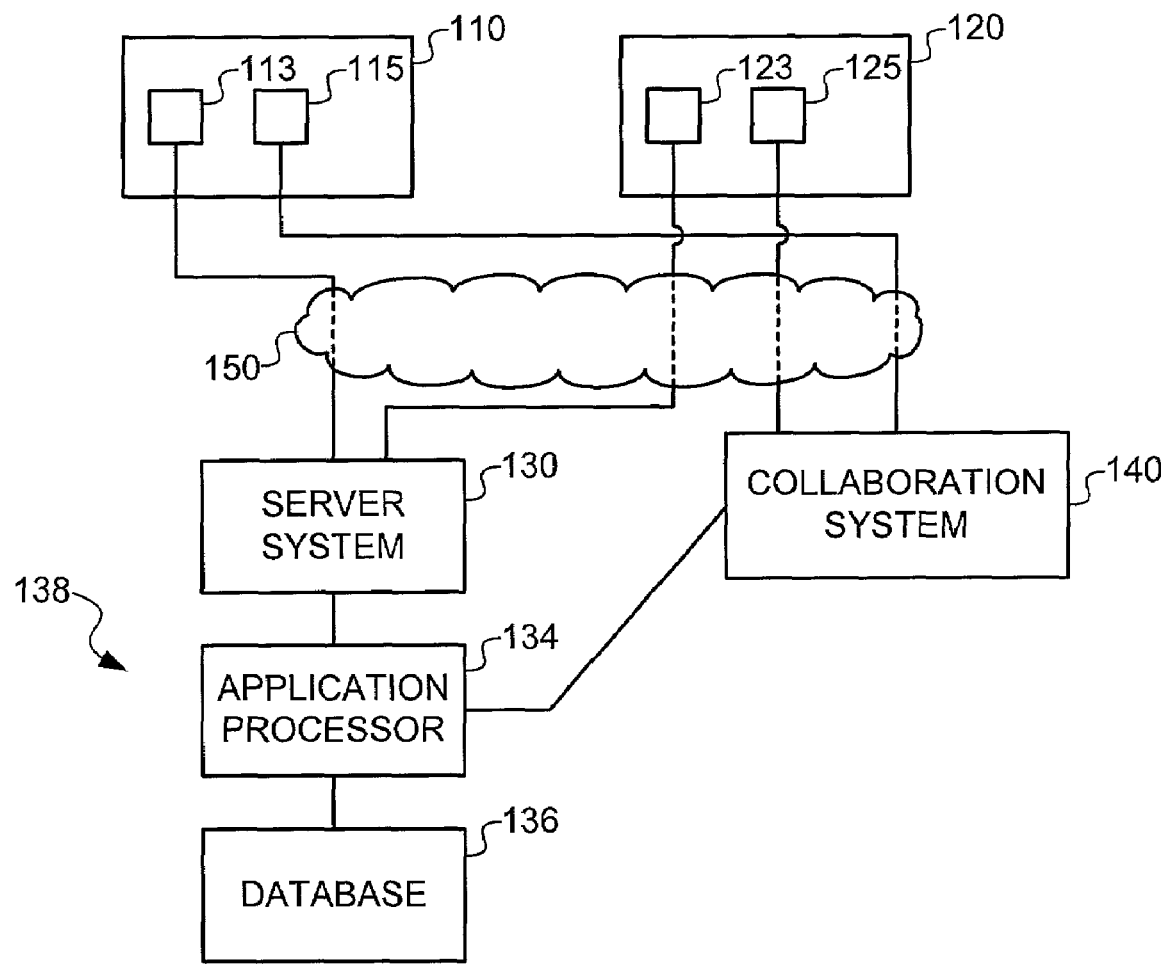
FIG. 1 portrays a system diagram of an embodiment of an integrated application system and collaboration system coupled to an agent terminal and a user terminal.

Referring now to FIG. 1, a user terminal 110 is coupled to an application system 138 across a network 150 by a browser application identified herein by the user browser window 113. As portrayed herein, the network 150 uses internet protocols and is the internet. An agent terminal 120 is coupled across the network 150 to the application system 138 by a browser application identified herein by the agent browser window 123. In the embodiment presented herein, the application system 138 provides a separate set of applications to a user terminal 110, and to an agent terminal 120.

After the user terminal 110 submits a web collaboration request, the user terminal 110 is also coupled to a collaboration system 140 across the network 150 by a browser application identified herein by a collaboration system control window 115. After the agent terminal 120 joins a web collaboration session established by the collaboration system 140 in response to the user terminal 110 request, the agent terminal 120 is also coupled across network 150 to the collaboration system 140 by a browser application identified herein by a collaboration system control window 125.

The collaboration system 140 is both a programmed computing system and a server system. The collaboration system 140 in operation provides capabilities like chat, co-browsing (in which the browser windows on both the agent and user terminals 120 and 110, display the same content that the other terminal is browsing), form-filling, desktop sharing, and voice over IP that will be referred to as a web collaboration capability. A "chat" means a real-time communication between two users/agents (or the like) via computer. Once a chat has been initiated, either user (or agent) terminal can enter text or other form (such as by typing on a terminal-coupled keyboard), and the entered text or other form will appear on the other user's/agent's (or the like) display.

The user terminal 110 and the agent terminal 120 are each coupled to the application system 138 through the application system server system 130. In an embodiment, the server system 130 is coupled to an application processor 134. In an embodiment, the application system processor 134 is coupled to a database 136 and to the collaboration system 140. The application system server system 130, application system processor 134, and database 136, are collectively termed herein the application system 138.

The embodiment portrayed with reference to FIG. 1 has a "user" terminal 110 and an "agent" terminal 120, the "user" terminal 110 and the "agent" terminal 120 displaying respectively a "user" browser window 113, and an "agent" browser window 123. The present invention specifically includes however any two terminals to be coupled to both the application system 138 and the collaboration system 140, the two terminals not necessarily having distinct functions. In this more general embodiment of the present invention, each of two terminals may be referred to as a "first" terminal and a "second" terminal respectively. It is specifically contemplated that the present invention is not dependent upon the illustrative embodiment of the application system 138 presented herein. An application system is a computer system of the type that is to provide a first browser page and a browser data to a first terminal and a second browser page and a second browser data to second terminal. The apparatus and method to couple a first terminal to a second terminal is disclosed presently.

The User Interface (UI) of a User Terminal

Figure 2:
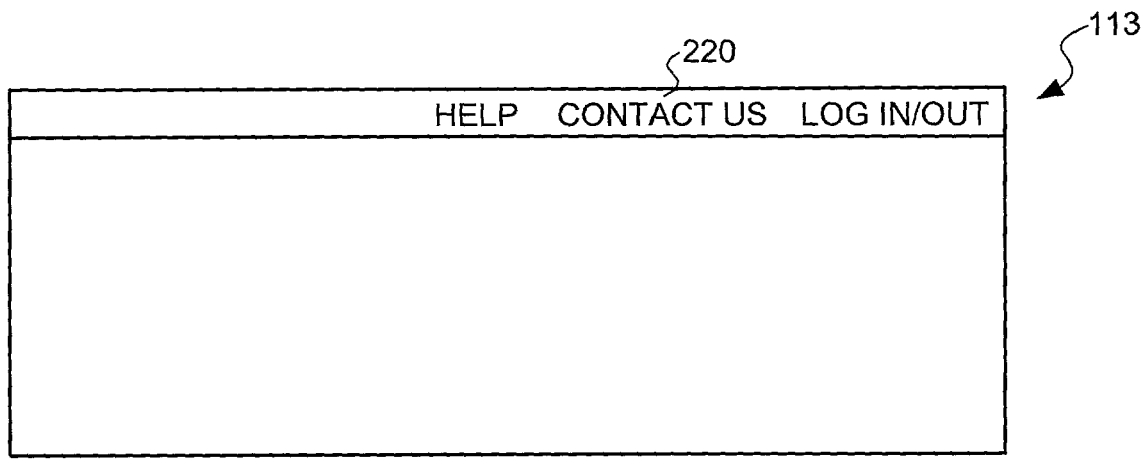
FIG. 2 portrays an embodiment of a user browser window page that includes a hyperlink to invoke available communication channels.

Referring to FIG. 2, the user browser window 113 includes a selection mechanism portrayed herein as a "Contact Us" button 220 to input to the application system 138 a request to contact an agent terminal 120 for a collaboration session. Of course, as is well known to those skilled in the pertinent art, the selection mechanism of this and any other selection mechanism disclosed herein can be any signaling device, such as a keyboard, a mouse click, or a portrayed display selection device such as a pull down menu or a selection button. In the embodiment described herein, in operation a click action on the "Contact Us" 220 button navigates the user browser window 113 to a browser page 302 (shown in FIG. 3) that has a hyperlink 310 (shown in FIG. 3) to invoke available communication channels.

Figure 3:
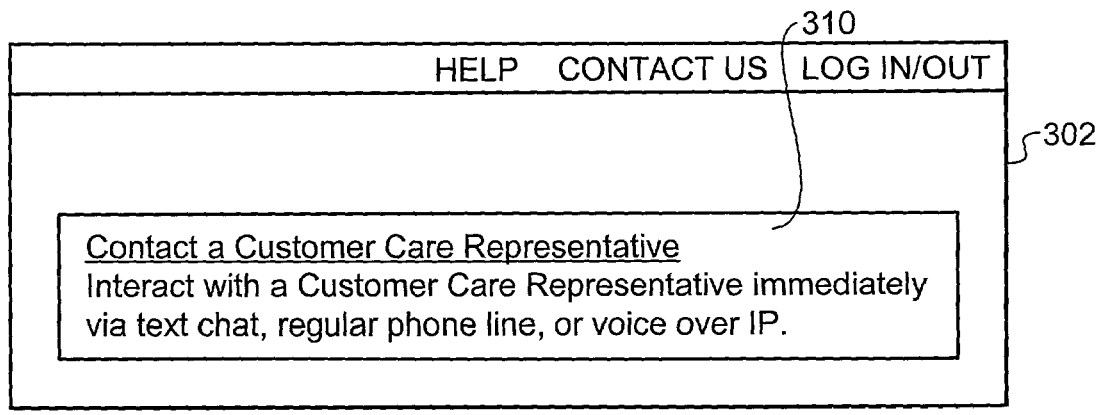
FIG. 3 portrays an embodiment of a user browser window page that has a hyperlink to make a collaboration request.
Figure 4:
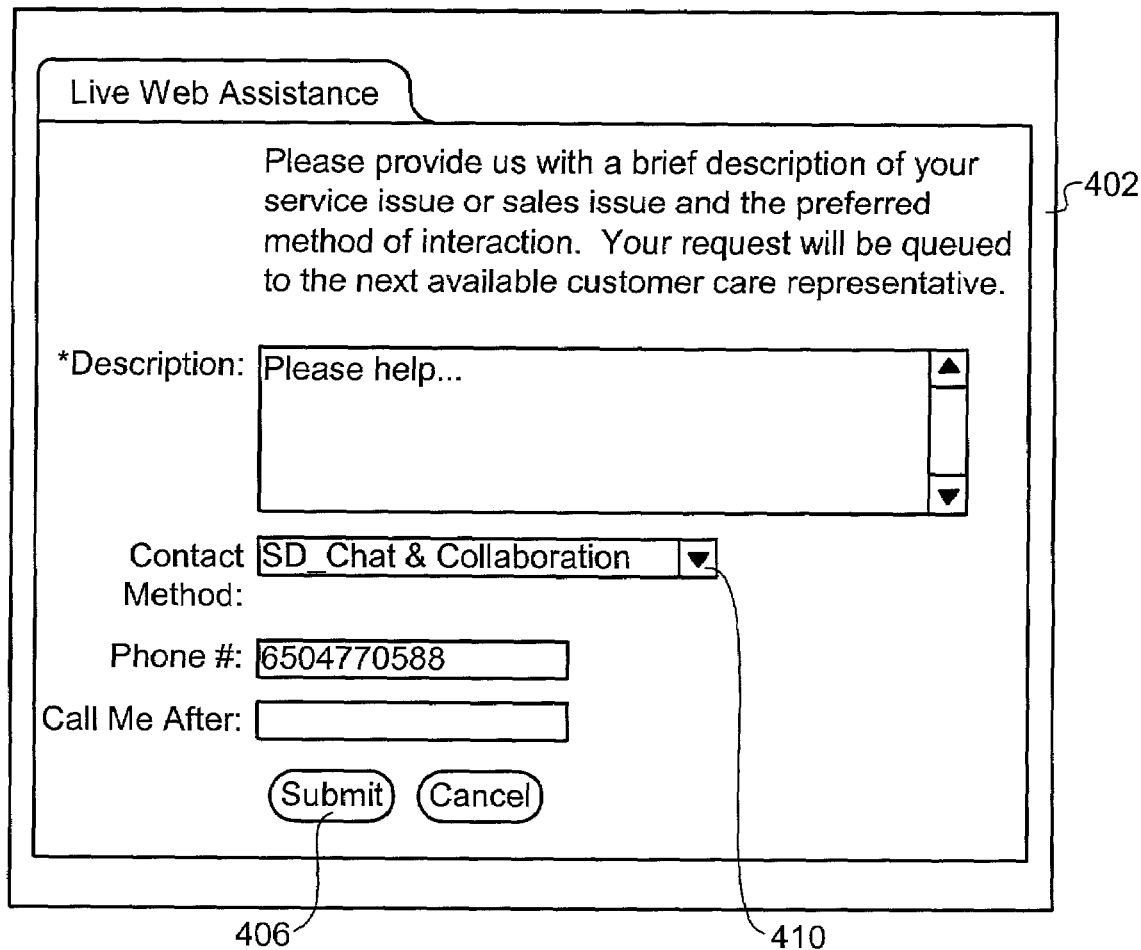
FIG. 4 portrays an embodiment of a user browser window page that includes a selection button to invoke an available collaboration mode.
Figure 5:
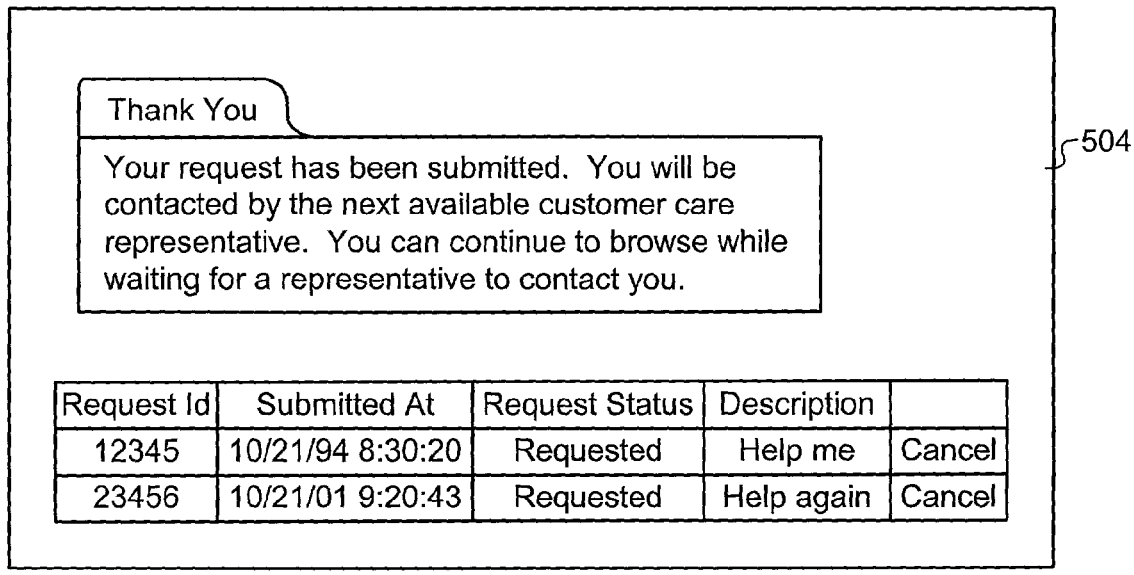
FIG. 5 portrays an embodiment of a user browser window page to acknowledge the status of the web collaboration request.
Figure 9:
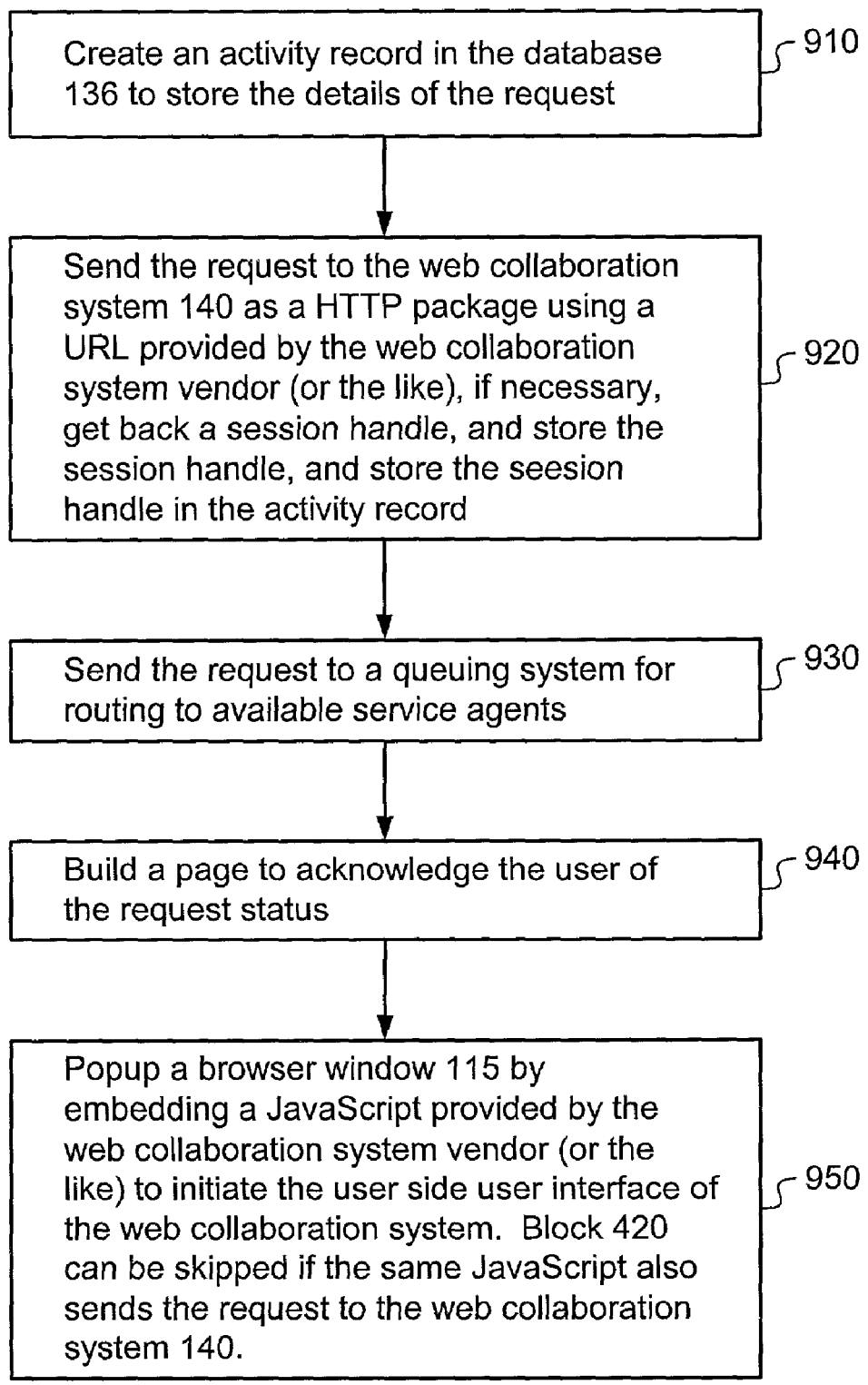
FIG. 9 portrays a flow chart of an embodiment of a method of an application system to process a terminal collaboration request (portrayed in FIG. 4) that includes sending the request to a collaboration system as a Hypertext Transfer Protocol (HTTP) package.

Referring to FIG. 3, the browser page 302 includes the hyperlink 310 that in operation in the embodiment described herein, navigates to a browser page "Live Web Assistance" 402 (shown in FIG. 4) that enables a selection of a contact method between a user terminal 110 and an agent terminal 120. Referring to FIG. 4, the "Live Web Assistance" browser page 402 includes a selection mechanism to select a collaboration mode 410, preferably as individual pull down selection items, each of the possible collaboration modes determined by the collaboration system 140 capability that in the preferred embodiment includes a "chat only", a "chat & collaboration", a "call back only", a "call back & collaboration", and a "voice over IP & collaboration" capability. In operation, a user of the user terminal 110 clicks on the "Submit" selection button 406 to submit the web collaboration request, and in response and referring now to FIG. 5, receives preferably a "Thank You" page 504 (FIG. 5) display. As shall be disclosed with reference to FIG. 9 presently, a new activity record is created in the database 136 in response to the collaboration request. The request is then sent to the web collaboration system as an HTTP package and a queuing system (not shown). An acknowledging page 504 is displayed to allow the user to monitor the request status.

Figure 6:
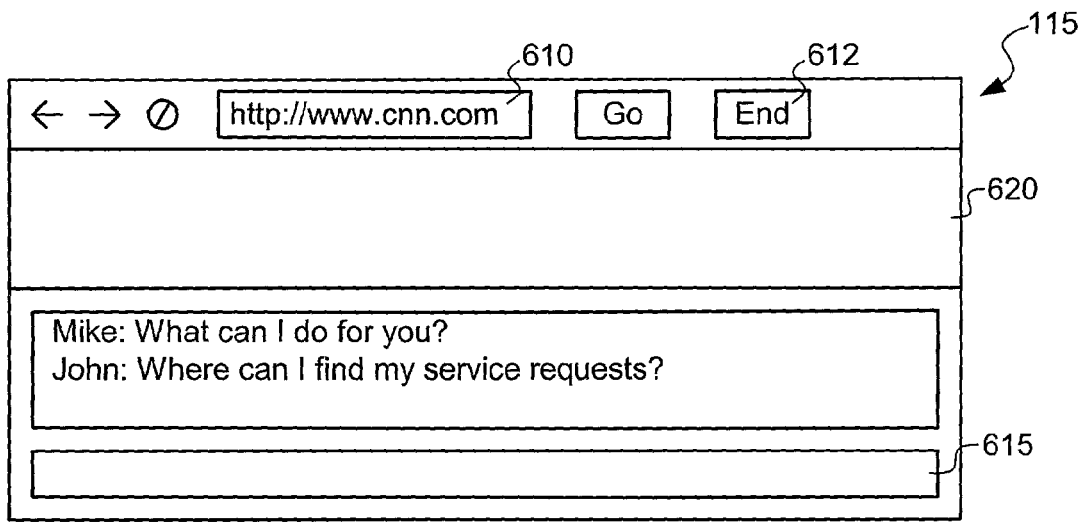
FIG. 6 portrays an embodiment of a collaboration window on a user desktop.

Referring to FIG. 6, a collaboration system control window 115 pops up on the user terminal 110 in response to a collaboration request disclosed with reference to FIG. 4 above. The collaboration system control window 115 is driven by the collaboration system 140 (shown in FIG. 1). The collaboration system control window 115 preferably has the following UI components: menus and/or toolbars 610, a chat box 615, and an embedded or separated co-browser window 620 to be presently described. In operation, when an agent answers a call at an agent terminal 120, the co-browser window 620 pops up (if not popped up when the request was submitted) and displays the page the user was browsing, the page that was displayed on the user terminal 110, before the user requested a collaboration by clicking the "Contact Us" 220 button (described above with reference to FIG. 2).

The user collaborates with the agent by typing in the chat box 615, pushing a Uniform Resource Locators (URLs) for an internet address (to be presently described), browsing in the co-browser window 620, or talking via a telephony device. The user can end the web collaboration session by selecting a user selection device, such as by clicking on a "End" button 612 in the collaboration control window. The user's original browser window 113 remains intact during the web collaboration session.

The User Interface of an Agent Terminal

Figure 7:
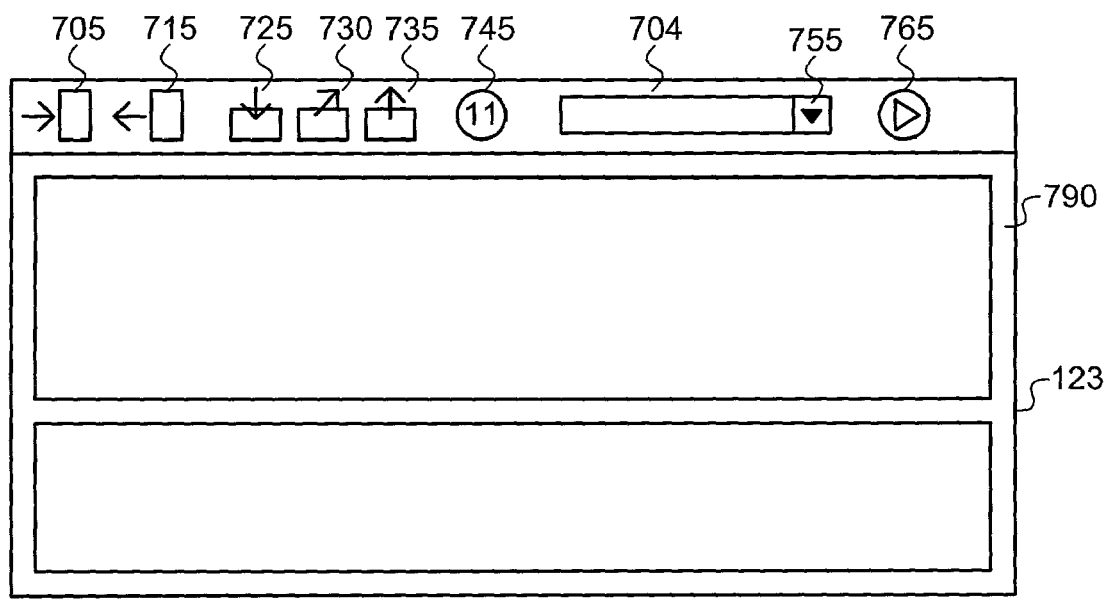
FIG. 7 portrays an embodiment of a service agent-user application window that includes a toolbar to control the collaboration session.

Referring to FIG. 7, an agent terminal 120 displays a toolbar 704 or other user interface that includes buttons or other selection mechanisms to control the collaboration between an agent and one or more users. A user-agent signs on as a call center agent at an agent terminal 120 by a selection mechanism operation, preferably by clicking on a "Sign On" button 705. In response to the signing on request, a web collaboration control window, if any, pops up on the agent terminal 120 to indicate that the agent terminal 120 is connected to the collaboration system 140. In response to a transmission of a web collaboration request, the "Accept" button 725 blinks to indicate that the agent terminal 120 is assigned to a collaboration request from a user terminal 110, and that the user terminal 110 is requesting a collaboration with the agent terminal 120. An agent accepts the collaboration request by a terminal selection, preferably clicking on the "Accept" button 725. In response to an agent terminal 120 accepting a collaboration request, the agent terminal application window 123 switches to a page 790 that displays the user's contact information, request history, and details of the current request.

Figure 8:
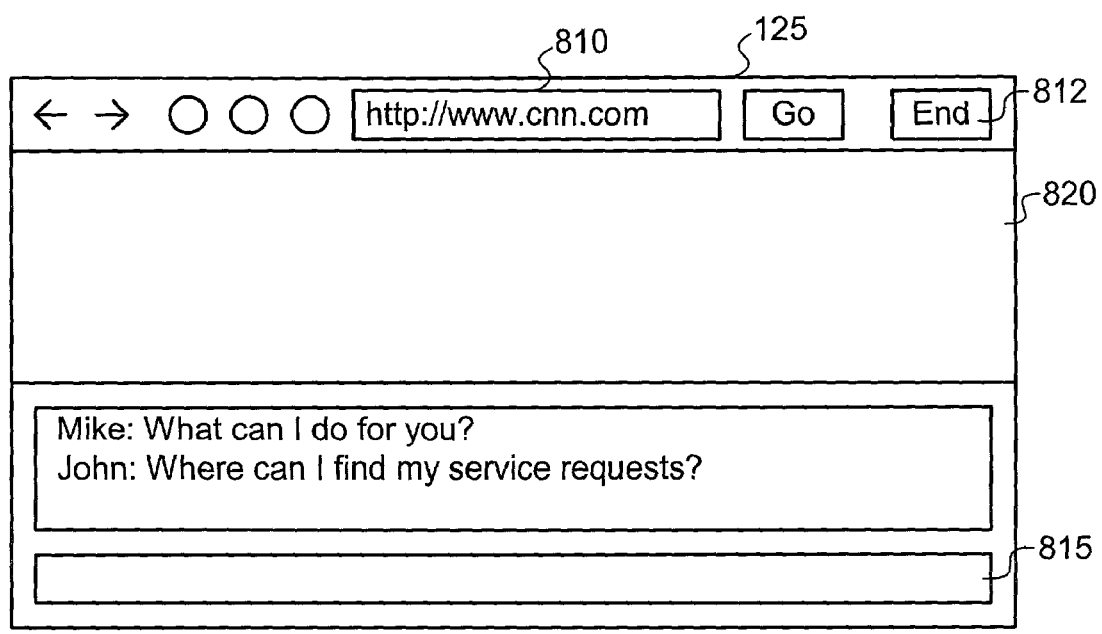
FIG. 8 portrays an embodiment of a collaboration window on a service agent-user desktop.

Referring now to FIG. 8, the collaboration system control window 125 pops up if not popped up when the agent signed on, or activated if already popped up when the agent signed on. The control window 125 includes a frame 820 that displays the page the user window 113 displayed at the time the user initiated the web collaboration request.

The agent collaborates with a user terminal 110 by typing into the agent terminal 120 chat box 815, pushing URLs in address box 810, browsing in the co-browser window 820, or talking via telephony. An agent can take other calls and hence handle multiple collaboration sessions. Each collaboration session has a separate browser window or frame if necessary. All the sessions preferably share a unitary control window.

An agent can suspend an active session by operating a selection mechanism, preferably by clicking on a "Suspend" button 745 on the toolbar 704. The collaboration system 140 is notified to refresh the collaboration system control windows 115 and 125. An agent can suspend an active session from the collaboration system control window 115 if a collaboration system 140 enables this feature. The agent terminal 120 is notified by the collaboration system to refresh window 113. An agent can activate a suspended session by operating a selection mechanism, preferably by clicking on an "Activate" button 765 on the toolbar 704. The collaboration system 140 is notified to refresh the collaboration system control windows 115 and 125. An agent can resume a paused session from the collaboration system control window 125 if a collaboration system 140 enables this feature. The agent terminal 120 is notified by the collaboration system to refresh window 123. An agent can switch from one session to another by operating a selection mechanism, preferably by picking a work-item from a "Work List" combo box 755 on the toolbar 704. The collaboration system 140 is notified to adjust the collaboration system control windows 115 and 125. An agent can switch from one session to another from the collaboration system control window 125 if a collaboration system 140 enables this feature. The agent terminal 120 is notified by the collaboration system 140 to refresh window 123. An agent can transfer an active session to another agent by operating a selection mechanism at the agent terminal 120, preferably by clicking on a "Transfer" button 730 on the toolbar 704. An agent can end a session by selecting an indictor at the agent terminal 120, preferably by clicking on a "Release" button 735 on the toolbar 704. A collaboration system control window 125 is notified to do necessary cleanup. An agent can end a session from a collaboration system control window 125 if the collaboration system 140 enables this feature. The agent terminal 120 is notified by the collaboration system 140 to do necessary cleanup. When a session ends, a chat script if any is saved, preferably in the application system 138 database 136.

Configuring Responses to UI Events

The core of the communication between the network computer system 138 and the collaboration system 140 is Hypertext Transfer Protocol (HTTP). The use of an HTTP protocol provides a platform independent framework for the application system 138 and the collaboration system 140 to synchronize events and transmit data.

The application system 138 provides a configuration mechanism for the collaboration system integrator to configure the way the application system 138 responds to UI events in the application system windows 113 and 123. For each collaboration system to be integrated with an application system, a set of JavaScript templates and URL templates provided by the collaboration system vendor or the like, or integrator of the collaboration system and the application system, is to be stored in application system database 136. In response to UI events in the application system windows 113 and 123, these templates are to be used by the application system 138 to initialize the user interface on both the user terminal 110 and the agent terminal 120, and to send notifications to the collaboration system 140. A set of URL templates of the application system is to be passed to the collaboration system at runtime when notification is sent from the application system 138 to the collaboration system 140. In response to UI events in the collaboration system windows 115 and 125, these templates are to be used to send notifications and data to the application system 138.

Referring now to FIG. 9, an embodiment of a process to be executed by the application system 138 in response to a terminal collaboration request (illustratively herein the "Submit" button 406 click) is shown. In block 910, the application system 138 creates an activity record in the system database 136 to store the details of the request. In block 920, the application system 138 sends the request to the collaboration system 140 using a URL template provided by the collaboration system vendor, integrator, or the like. Depending upon the collaboration system 140, a session handle for the web collaboration session to be established is to be returned and saved in the application system database 136. In block 930, the request is sent to a queuing system (not shown) or the like in order to be dispatched to an available agent terminal 120. In block 940, a new page is built to acknowledge the user of the request status. In block 950, a popup browser window is to be opened by a JavaScript template embedded in the acknowledging page to initialize the user side user interface for the collaboration system, presumably by downloading the collaboration system 140 user side Java applets. If necessary, the JavaScript template can also be used to send the request to the collaboration system 140 in an embodiment, and in this instance the block 920 is not included in the method.

Use of Templates in Configurations

Referring to FIG. 10, an exemplary configuration for the response described with reference to FIG. 9 is portrayed. Each step is supported by a function 1002 of a business service object "Web Collab Service" 1005, the "business service object" referring to an integrated collection of data and functions that describe an entity as well as the operations that the entity can perform. The values to the input parameters of business service methods may have different formats. Illustratively a constant string format 1017 with its face value, a URL template 1012 referenced by its name "CallerSubmitURL", and a JavaScript template 1015 referenced by its name "CallerUIScript". The configuration, together with the templates used in the configuration, is not defined by the application system 138 but presumed to be designed by the collaboration system vendor, an integrator, or the like, and pre-stored in the application system database 136. The templates are categorized by the collaboration systems and languages the collaboration systems support. Integrating with a changed and different collaboration system is simplified to a design of a distinct set of templates and, if necessary, a configuration.

Use of Placeholders in Templates

Referring to FIG. 11, an exemplary template 1102 for the "CallerSubmitURL" 1012 (referenced in FIG. 10) is depicted. The template 1102 includes sub-strings that are prefixed and suffixed by the character '$' 1120. A sub-string that is prefixed by a specific sub-string presumably configurable) and suffixed by a specific sub-string presumably configurable), such as the character "$" is called a "placeholder" 1125. Placeholders 1125 are to be used in templates to pass runtime values from the application systems 138. The values of placeholders 1125 are encoded according to the context of the template. Placeholders that appear in a URL template are url-encoded and placeholders that appear in a script are JavaScript encoded. Placeholders that represent URLs are doubly url-encoded in a URL template, and are url-encoded and then JavaScript encoded in a JavaScript template. For efficiency, a set of predefined placeholders are to be provided. Additional placeholders are to be defined by configuring the application system. The placeholder 1105 is to pass a user identification that is presumed to be obtained from the application system database 136 to the collaboration system at runtime. The placeholder 1107 is to pass a URL used to bring up the first browser page in the co-browser frame 620 (FIG. 6) and 820 (FIG. 8). If the collaboration system 140 in an embodiment provides a way for a user to cancel a submitted request, the collaboration system 140 is to notify the application system that the request is cancelled by using a URL provided by the application system. The placeholder 1109 illustratively shows how the URL can be passed to the collaboration system.

Generally, a collaboration system acquires a runtime value(s) from an application system by designing configurations and templates to be used by the configurations using predefined placeholders and configurable placeholders. The outbound communications from the application system are transparent from the application system because the configurations and templates are not defined by the application system but are instead transmitted to the application system by preferably the collaboration system vendor, an integrator, or the like.

Referring to FIG. 12, an exemplary JavaScript template 1202 to initialize collaboration system user side UI includes placeholders 1210.

Figure 13:
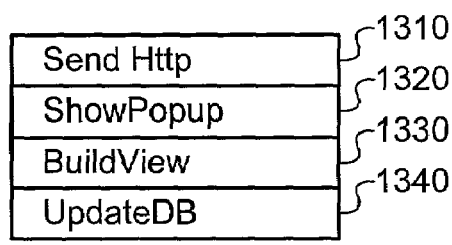
FIG. 13 portrays an embodiment of a collection of methods in a business service object to support four basic operations for outbound communications.

Referring to FIG. 13, a collection of methods of a business service object to support the basic operations for an application system can be used in configurations to support complex operations. A method "SendHttp" 1310 is to send an HTTP package using a set of URL templates. The method 1310 can be used to send notifications to the collaboration system 140 using the templates provided by the collaboration system 140. A method "ShowPopup" 1320 is to create a new browser window with an initial URL or initial page content. The method 1320 can be used to initialize a user interface of the collaboration system using URL or JavaScript templates provided by the collaboration system. A method "BuildView" 1330 is to build a new web page for the application system browser. The method 1330 can be used to build the acknowledging page for the user terminal 110 in window 113 and to request a detailed page for the agent terminal 120 in window 123. A JavaScript template can be embedded in the pages to be built to initialize a user interface or to send a notification to the collaboration system 140 as necessary. A Method "UpdateDB" 1340 is to update the database 136 in response to UI events.

Figure 14:
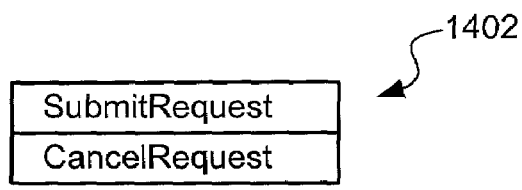
FIG. 14 portrays an embodiment of a collection of methods in a business service object to support user-side operations for outbound communications.
Figure 15:
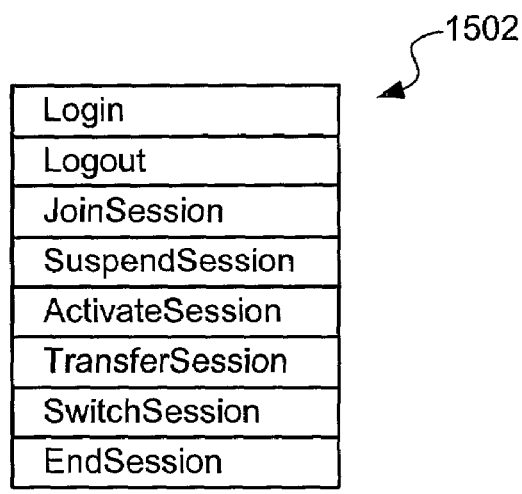
FIG. 15 portrays an embodiment of a collection of methods in a business service object tot support agent-side operations for outbound communications.

Referring to both FIG. 14 and to FIG. 15, a collection of functions 1402 and 1502 of a business service object that correspond respectively to the commonly supported collaboration related UI events in application system browser 113 and 123 described above. These functions are implemented for efficiency. The same functionality can be achieved using a combination of the basic functions described above via configuration.

Figure 16:
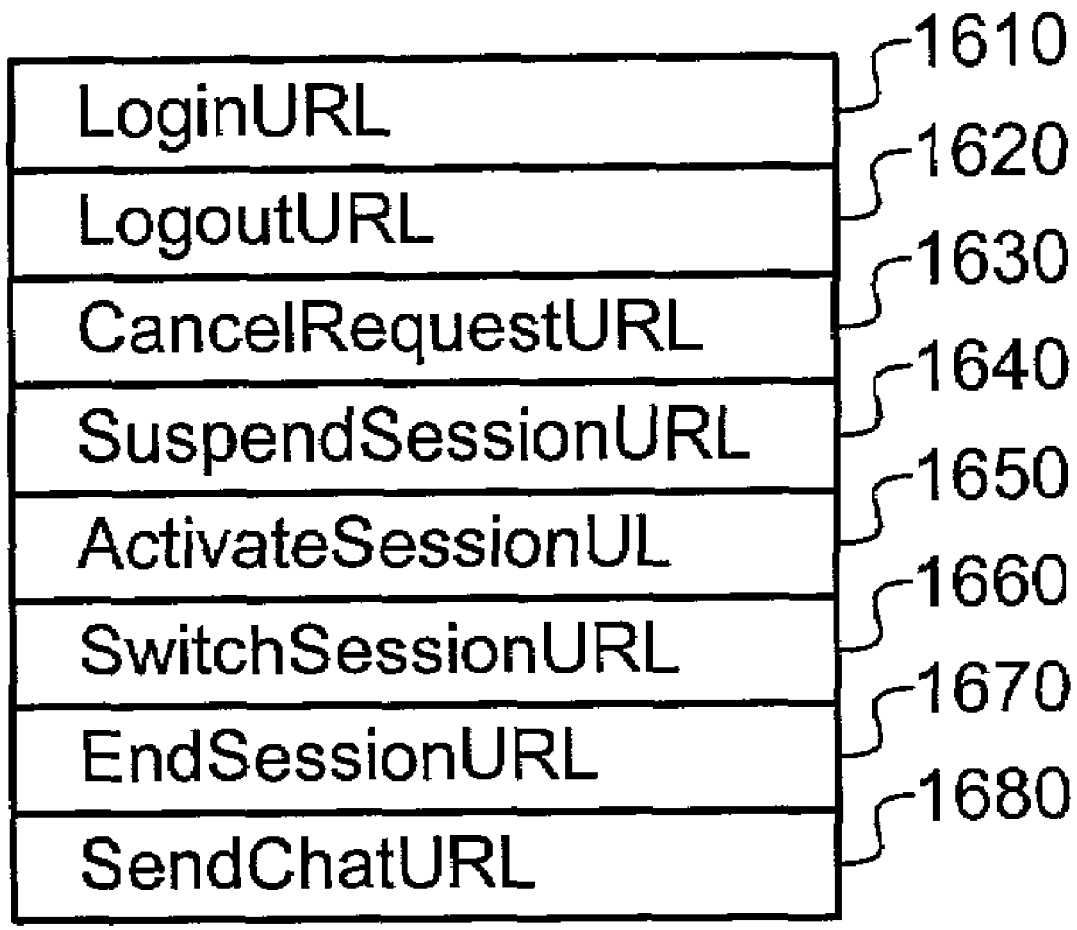
FIG. 16 portrays an embodiment of a collection of URLs to be passed to the collaboration system for inbound communications.

FIG. 16 depicts the application system URLs 1610–1680 available for inbound communications from the collaboration system. "LoginURL" URL 1610 is for the collaboration system to bring up a first browser page in the co-browsers 620 and 820. The page is the same page a user terminal 110 was displaying before the web collaboration request was initiated. "LogoutURL" URL 1620 is for the collaboration system to logout a web session for the co-browsers 620 and 820, if necessary, when a web collaboration session ends. "CancelRequestURL" URL 1630 is for the collaboration system to notify an application system when a submitted session is canceled in the collaboration system control windows 115 and 125. In response to receiving the notification, the application system is to notify the queuing system (not shown) or the like to pull back the request and to update the status of the associated activity record. "SuspendSessionURL" URL is for a collaboration system to notify an application system when an agent terminal 120 suspends a session from the collaboration system control window 125. "ActivateSessionURL" URL 1650 is for a collaboration system to notify an application system when an agent terminal 120 activates a suspended session from the collaboration system control window 125. "SwitchSessionURL" URL 1660 is for a collaboration system to notify an application system when an agent 120 in the case of multiple collaboration sessions, switches from one session to another session from the collaboration system control window 125. "EndSessionURL" URL 1670 is for a collaboration system to notify an application system when a user terminal 110 or an agent terminal 120 ends a session from the collaboration system control window 115 or 125. "SendChatURL" URL 1680 is for a collaboration system to send a chat transcript to an application system when a session ends. The chat transcript is to be stored as an attachment to an activity record in the application system database 136.

While certain exemplary embodiments have been described and shown in the accompanying drawings, it is to be understood that these embodiments are merely illustrative of and not restrictive of the broad invention. The present invention is not limited to the specific constructions and arrangements shown and described, and alternative embodiments will become apparent to those skilled in the art to which the present invention pertains without departing from the scope of the present invention. The scope of the present invention is defined by the appended claims rather than the foregoing description.

What is claimed is:

1. A method comprising:
    integrating a collaboration system with a computer system of a type that is to provide a first browser page and a browser data to a first terminal and a second browser page and a second browser data to a second terminal, wherein integrating the collaboration system with the computer system comprises:
        the computer system receiving from the collaboration system a network transmission medium characterized by at least one of at least one script template and at least one network address template, said templates of the type having predefined placeholders and configurable placeholders;
        the computer system configuring the configurable placeholders by providing run time values to each of the script templates and each of the network address templates according to a context of the template; and
        the computer system invoking the network transmission medium to notify the collaboration system of at least one computer system event.

2. The method defined in claim 1 wherein the network address is a URL.

3. The method defined in claim 1 wherein the script is a JavaScript script.

4. The method defined in claim 1 wherein the computer system event is at least one of a start the collaboration session request, a join the collaboration session request, a transfer the collaboration session request, a switch the collaboration session request, and an end the collaboration session request.

5. The method defined in claim 1 wherein the first terminal is a user terminal and the second terminal is an agent terminal.

6. The method defined in claim 1 wherein the templates are HTTP protocol templates.

7. The method defined in claim 1 further including in response to the computer system receiving a network transmission medium, storing the network transmission medium in a database.

8. The method defined in claim 7 further including storing the network transmission medium as a file attachment.

9. A system comprising:
    a network computer system to provide a first browser page to a first browser in a first terminal, and a second browser page to a second browser in a second terminal, and to enable a communication of data between the first browser and the second browser, the network computer system having a server system to couple to the first terminal and to the second terminal across a network;
    a collaboration system coupled to the network computer system across a network, the collaboration system having a system to couple to the first terminal and to the second terminal across a network;
    wherein the computer system and the collaboration system are to communicate with each other to at least one of start, join, transfer, switch, and end the collaboration session;
    wherein the computer system is to receive at least one template from the collaboration system the at least one template having predefined placeholders and configurable placeholders, and
    wherein the communication is at least partially in a client-server language and in accordance with the at least one template received by the computer system from the collaboration system.

10. The system defined in claim 9 wherein the first terminal is a user terminal and the second terminal is an agent terminal.

11. The system defined in claim 9 wherein the communication from the network computer system to the collaboration system is according to a medium characterized by at least one of URLs and scripts.

12. The system defined in claim 11 wherein an at least one placeholder having a value is transmitted in accordance with the medium.

13. The system defined in claim 12 wherein the computer system is to replace the placeholders with actual values at runtime.

14. The system defined in claim 11 wherein the medium and a placeholder template is pre-installed in the network computer system.

15. The system defined in claim 11 wherein at least one template is transmitted according to the medium, the template including at least one placeholder having a parameter value.

16. The system defined in claim 9 wherein the client-server language is HTTP.

17. The system defined in claim 9 wherein the communication from the collaboration system to the network computer system is according to invoked URLs.

18. The system defined in claim 9 wherein the computer system transmits an at least one placeholder value according to a URL to a function in the collaboration system in response to a collaboration request transmitted from the first terminal to the computer system, and the collaboration system transmits a collaboration system window to the first terminal in response to the function receiving the placeholder value.

19. The system defined in claim 18 wherein the URL and the placeholder are defined in the computer system before the collaboration request.

20. The system defined in claim 9 wherein the computer system transmits at least one placeholder value according to a URL to a function in the collaboration system in response to a second terminal accepting a collaboration session with a first terminal, and the collaboration system transmits a co-browser window to the second terminal in response to the function receiving the placeholder value.

21. The system defined in claim 20 wherein the URL and the placeholder are defined in the computer system before the accepting.

22. The system defined in claim 20 wherein the collaboration session is initiated by a request at the first terminal, and wherein if the first terminal was displaying a browser page during the request, the collaboration system is to initially transmit the browser page for display in the co-browser window.

23. system comprising:
    an interface between a computer system and a collaboration system to be coupled to one another by a network, the computer system of a type that provides a first browser page and first browser data to a first terminal, and a second browser page and second browser data to a second terminal, and the collaboration system of the type that provides a collaboration session between the first terminal and the second terminal the interface comprising at least one of:
(a) the computer system to send to the collaboration system a request the computer system receives from one of the second terminal and the first terminal in a network protocol to a collaboration system network address,
(b) the collaboration system to send to the computer system a request the collaboration system receives from one of the second terminal and the first terminal in a network protocol to a computer system network address, and
(c) the computer system to send to the collaboration system a request the computer system receives from one of the second terminal and the first terminal in a script defined by at least one template received by the computer system from the collaboration system, the template having predefined placeholders and placeholders configurable by the computer system.

24. The system defined in claim 23 wherein the first terminal is a user terminal and the second terminal is an agent terminal.

25. The system defined in claim 23 wherein the network protocol is HTTP.

26. The system defined in claim 23 wherein the network address is a URL.

27. The system defined in claim 26 wherein the URL specifies what action the collaboration system is to take.

28. The system defined in claim 23 wherein the collaboration system request in (b) depends upon the request.

29. The system defined in claim 23 wherein the requests include at least one of a start the collaboration session, a join the collaboration session, a transfer the collaboration session, a switch the collaboration session, and an end the collaboration session request.

30. The system defined in claim 23 wherein the collaboration system network address is in the computer system before the request.

31. The system defined in claim 30 where the collaboration system network address is transmitted from the collaboration system to the computer system before the request.

32. The system defined in claim 23 wherein the request in both paragraph (a) and paragraph (b) includes at least one parameter value according to a template.

33. The system defined in claim 32 wherein the template for the request in paragraph (b) is in the computer system before the request.

34. The system defined in claim 33 wherein the script in paragraph (c) includes a template and the template is in the computer system before the request.

35. The system defined in claim 32 wherein the template for the request in paragraph (b) is transmitted from the collaboration system to the computer system before the request.

36. The system defined in claim 32 wherein the template depends upon the request.

37. The system defined in claim 23 wherein the collaboration system network address is in the collaboration system before the request.

38. The system defined in claim 37 wherein the collaboration system network address is transmitted from the collaboration system to the computer system before the request.

* * * * *